Patented Nov. 11, 1941

2,262,087

UNITED STATES PATENT OFFICE 2,262,087

CHEWING GUM TABLET

Kenneth A. Bartlett, Essex Fells, and William J. Schultz, West Orange, N. J., assignors to White Laboratories, Inc., Newark, N. J., a corporation of New Jersey No Drawing. Application May 21, 1940, Serial No. 336,354

8 Claims. (Cl. 167—82)

This invention relates to medicinal chewing gum tablets.

There are recognized advantages in incorporating medicaments in chewing gum tablets, among them being the fact that, by chewing, the medicament is gradually released from the tablet and is swallowed gradually in more readily effective availability than when an entire ordinary medicinal tablet is swallowed whole.

With some medicaments no particular difficulty is encountered. In some instances the medicine can be included in the gum center, by mixing it with the chicle before it is formed into gum centers. In other instances, for example, where the medicament is water soluble, it may simply be stirred into the coating syrup, such as the usual simple or other sugar syrup, with which the gum centers may then be coated in the usual manner.

There are instances, however, where the desired result cannot be accomplished by either of these procedures. The insoluble alkalies used for internal medication furnish an example, and the present invention is especially directed to a chewing gum tablet containing such medicaments and to the method hereinafter described for producing such tablets.

Because of their nature and their actual physical bulk required for an active dose, these medicinally used insoluble alkalies cannot be incorporated with the chicle in such quantities as to yield an active dose from a chewing gum tablet of ordinary or normal size without destroying the characteristic and desirable chewing quality of the gum itself, the overload of medicament therein causing physical disintegration of the gum center of the tablet on chewing, and producing a mere quantity of crumbly particles impossible to chew as a gum mass. This effectively prevents the desired separation of the medicament from the gum mass by chewing, and it becomes impossible to retain the gum in the mouth and swallow only the medicament.

Calcium carbonate, magnesium trisilicate, aluminum hydroxide, magnesium carbonate, bismuth subcarbonate, bismuth subnitrate, magnesium hydroxide and magnesium oxide are examples of some specific substances in the class of insoluble alkalies used for internal medication. Mixed with the chicle in satisfactory quantity these substances or a mixture or mixtures of them will produce a hard gum center having a tendency to crack. Without causing physical disintegration of the gum on chewing, the medicaments of this class can be included in the chicle only to the extent of about 10% by weight of the finished normal tablet, and the further disadvantage is encountered that something like 80% of the medicament added to the chicle is retained by the gum even after prolonged chewing. Thus the amount of usable medicament in the tablet is only about 2% of the weight of the finished tablet, and may therefore be said to have no substantial significance from the therapeutic standpoint.

Attempts have been made to avoid the difficulty encountered with this class of medicament by stirring the medicament as a powder into the sugar syrup prior to coating. But here again limits were soon reached before producing an active usable dose. The addition of enough of the insoluble alkali to the coating syrup creates an extremely brittle coating, crumbling, on chewing, into a multitude of hard brittle fragments that have the effect of chopping up the gum center into small particles which can not thereafter be chewed into a gum mass from which the medicament can be chewed out and separately swallowed.

For example, it has been found that a mixture of magnesium trisilicate and calcium carbonate, or either of them alone, could be so included in the sugar coating only to the extent of about 9% by weight of the finished tablet without destroying its chewing quality, and causing crumbling and physical disintegration of the gum in the mouth when chewed.

If smaller amounts of such insoluble alkalies are added to the tablet in each, successively, of a plurality of coatings, by known methods, such as pouring on the tablets a succession of coating syrup solutions, each solution containing part of the dose to be incorporated in the tablet, by the time a satisfactory active dose has been built up the tablet is too large, and the coating is not only highly brittle but so thick that its very brittle bulk prevents its assimilation with the gum center on chewing and causes the center to disintegrate physically and become crumbly, thus not only producing an undesirable chew but one which has lost the chewing quality necessary to administer the dose as desired, that is, separately from gum particles.

An object of the present invention is to overcome the foregoing difficulties encountered with medicaments of the class referred to, and, specifically, to provide a tablet of ordinary or normal size containing an active dose, and a method for incorporating in a chewing gum tablet of normal size an active dose, of medicinal insoluble alkali, or a mixture of such alkalies in such a manner that the desired dose is usable for its intended purpose and the desired chewing characteristics of the gum center are fully preserved, so that the active medicament is readily available and the gum center does not crumble or physically disintegrate upon chewing the tablet.

Moreover, it is an object of the invention to provide such a method which avoids clumping of the tablets throughout the medication stage despite the fact that such a relatively large quantity of medicament is to be incorporated in the tablet.

By way of example, and to indicate what is meant by reference to physical bulk of an adequate dose in relation to a chewing gum tablet of normal size, and to give some idea of what can be accomplished by the present process as distinguished from prior methods such as those above referred to, we may say that by the present process we are able satisfactorily to produce a chewing gum tablet of normal size and desired chewing quality in which the active dose of insoluble alkali constitutes up to 25% of the total weight of the tablet, and even more if desired, or where mixtures of such alkalies constitute up to 25% or more of the total weight of the tablet.

Where, as in one example of carrying out the invention, a total of 8 grains of magnesium trisilicate and calcium carbonate is to be included in each tablet, the mixture for each tablet may comprise 2.5 grains of magnesium trisilicate and 5.5 grains of calcium carbonate, the mixture being in the form of a dry powder, made up in the quantity necessary for the number of tablets to be treated. Other specific examples of the invention are the inclusion in each tablet of 8 grains of calcium carbonate alone, or 8 grains of magnesium trisilicate alone, but the following procedure is applicable to any specific medicament in the class alone or to mixtures of them in different proportions. They all have the same coating difficulty characteristics, and an active dose of any of them is relatively bulky.

For example, and referring now particularly to the method of the present invention, the gum centers may be prepared in the usual way, ready for coating. They are then coated, in a coating pan, with a solution of corn syrup, granulated sugar and gum arabic. During the coating the tablets are sprinkled with enough coating sugar to keep them from sticking together. No clumping difficulty is encountered at this stage.

When the syrup solution has been evenly distributed over the known number of tablets in the coating pan, approximately 16% of the total quantity of medicament prepared for that number of tablets is sprinkled, as a fine powder, over the tablets while they are tumbling about in the coating pan.

In a short time, of the order of five minutes, all of this quantity of the medicament that will adhere to the tablets will have adhered, a small powder surplus accumulating in the rear of the pan. The completion of this stage can readily be judged by eye. The provision of enough of the powdered medicament so that there will be some surplus is important, for if barely as much is supplied as the tablets will take up, they will start picking the powder mixture off one another. There should, therefore, be enough more than the tablets will take up to provide some loose powder all among the tablets. In any of the present specific examples, and ordinarily, about ⅙ of the total quantity of medicament is sufficient to assure this, but with any particular medicament or mixture the slight excess required is readily determinable.

When the tablets will take up no more, as evidenced by the surplus powder accumulation in the rear of the coating pan, the tablets are sprayed with a fine mist of simple sugar coating syrup, care being taken that no more is sprayed on the tablets than enough to enable them to pick up the surplus powder. The safest procedure at this point is to spray the tablets several times for this purpose, just enough to insure that the surplus powder will be picked up by them. A surplus of sugar syrup at this stage, such as would be caused by pouring sugar syrup over the tablets, will not only cause the tablets to stick together, forming clumps of tablets, but also will cause the formation of the undesirable brittle coating above referred to. The fine mist spraying in limited quantities not only prevents the tablets from clumping but also enables the tablets to take up the surplus loose powder without producing the aforementioned undesirable brittleness in the coating.

When the surplus powder has been picked up, the tablets are dried with air. When dry, more of the solution of corn syrup, granulated sugar and gum arabic is supplied to the tablets, the quantity being what the tablets will take, a small amount of coating sugar being used as before to prevent sticking, and the next one-sixth or about 16% of the medicament powder added as before, the amount again being just enough to insure the desired surplus of powder over what the tablets will take up.

The tablets are then sprayed again, as before, with just enough coating syrup in the form of a fine mist to enable them to take up the powder surplus.

The steps outlined are repeated until the required dosage is built up. The tablets are then dried on trays for two or three days, after which they are sugar coated in usual manner to desired size.

By this method 8 grains of insoluble alkali medicament, such for example as the magnesium trisilicate and calcium carbonate mixture or 8 grains of either of them alone, can be incorporated in the tablet—more if desired—without producing a brittle coating, without jeopardizing the chewing quality of the gum center, and without producing either an oversize coating or an oversize tablet. In all of the internally used medicaments of the insoluble alkali class the active dose of medicament constitutes about 25% of the total weight of the finished tablet. This is to be distinguished from prior attempts to produce chewing gum tablets medicated with internally used medicaments of the insoluble alkali class where the best that could be accomplished was the inclusion of such medicaments in usable amounts of the order of two or three percent. The present invention provides an active dose in usable form and the desirable chewing characteristics of the gum center are fully preserved. On chewing, the medicament is readily separable from the gum mass.

It will be understood that the tablet of the present invention is one in which the coating contains insoluble alkali medicament in such amounts as are here indicated, and that the medicament may be composed entirely of one or more insoluble alkalies or of one or more of them with other substances where the medicament mixture to be applied includes an amount of insoluble alkali medicament of the order stated.

What is claimed is:

1. A chewing gum tablet comprising a gum center having a plurality of coatings containing an insoluble alkali medicament, alternating with sugar syrup coatings, the amount of said medicament being of the order of 25% by weight of the entire tablet.

2. A chewing gum tablet comprising a gum center having a series of alternate coatings thereon containing an insoluble alkali medicament including calcium carbonate, and sugar syrup, the amount of insoluble alkali medicament being of the order of 25% by weight of the entire tablet.

3. A chewing gum tablet comprising a gum center having a series of alternate coatings thereon containing an insoluble alkali medicament including magnesium trisilicate, and sugar syrup, the amount of insoluble alkali medicament being of the order of 25% by weight of the entire tablet.

4. A chewing gum tablet comprising a gum center having a series of alternate coatings thereon containing an insoluble alkali medicament including calcium carbonate and magnesium trisilicate, and sugar syrup, the amount of insoluble alkali medicament being of the order of 25% by weight of the entire tablet.

5. The method of producing a series of alternate sugar syrup and medicament coatings on chewing gum centers which comprises supplying said centers with coating syrup solution, then when the centers have been evenly covered, supplying them with finely powdered insoluble alkali medicament in excess of the amount the syrup covered centers will take up, then, when the centers will take up no more, causing them to take up the excess by spraying them with a sugar syrup in the form of a fine mist and in an amount just sufficient to cause said centers to take up the excess, drying the tablets, and repeating the foregoing steps until a desired active medicament dose has been included in the coatings.

6. The method of producing a series of alternate sugar syrup and medicament coatings on chewing gum centers which comprises supplying said centers with coating syrup solution, then, when the centers have been evenly covered, supplying them with a finely powdered magnesium trisilicate medicament in excess of the amount the syrup covered centers will take up, then, when the centers will take up no more, causing them to take up the excess by spraying them with a sugar syrup in the form of a fine mist and in an amount just sufficient to cause said centers to take up the excess, drying the tablets, and repeating the foregoing steps until a desired active medicament dose has been included in the coatings.

7. The method of producing a series of alternate sugar syrup and medicament coatings on chewing gum centers which comprises supplying said centers with coating syrup solution, then, when the centers have been evenly covered, supplying them with a finely powdered calcium carbonate medicament in excess of the amount the syrup covered centers will take up, then, when the centers will take up no more, causing them to take up the excess by spraying them with a sugar syrup in the form of a fine mist and in an amount just sufficient to cause said centers to take up the excess, drying the tablets, and repeating the foregoing steps until a desired active medicament dose has been included in the coatings.

8. The method of producing a series of alternate sugar syrup and medicament coatings on chewing gum centers which comprises supplying said centers with coating syrup solution, then, when the centers have been evenly covered, supplying them with a finely powdered mixture of magnesium trisilicate and calcium carbonate in excess of the amount the syrup covered centers will take up, then, when the centers will take up no more, causing them to take up the excess by spraying them with a sugar syrup in the form of a fine mist and in an amount just sufficient to cause said centers to take up the excess, drying the tablets, and repeating the foregoing steps until a desired active medicament dose has been included in the coatings.

KENNETH A. BARTLETT.
WILLIAM J. SCHULTZ.